(12) United States Patent
Raksha et al.

(10) Patent No.: US 12,152,152 B2
(45) Date of Patent: Nov. 26, 2024

(54) SECURITY PIGMENT

(71) Applicant: VIAVI SOLUTIONS INC., San Jose, CA (US)

(72) Inventors: Vladimir P. Raksha, Santa Rosa, CA (US); Cornelis Jan Delst, Fairfax, CA (US)

(73) Assignee: VIAVI SOLUTIONS INC., Chandler, AZ (US)

(*) Notice: Subject to any disclaimer, the term of this patent is extended or adjusted under 35 U.S.C. 154(b) by 489 days.

(21) Appl. No.: 16/894,517

(22) Filed: Jun. 5, 2020

(65) Prior Publication Data

US 2021/0380812 A1 Dec. 9, 2021

(51) Int. Cl.
| | | |
|---|---|---|
| *C09C 1/00* | (2006.01) | |
| *B41M 3/14* | (2006.01) | |
| *B42D 25/29* | (2014.01) | |
| *C09D 11/037* | (2014.01) | |

(52) U.S. Cl.
CPC .............. *C09C 1/0015* (2013.01); *B41M 3/14* (2013.01); *B42D 25/29* (2014.10); *C09D 11/037* (2013.01); *C01P 2006/42* (2013.01); *C09C 2200/1054* (2013.01); *C09C 2200/24* (2013.01); *C09C 2200/301* (2013.01)

(58) Field of Classification Search
CPC .......... C09C 1/0015; C09C 2200/1054; C09C 2200/301; C09C 1/00; B41M 3/14; B42D 25/29; B42D 25/369; C09D 11/037; C01P 2006/42
USPC .................... 283/67, 70, 72, 82, 94, 98, 901
See application file for complete search history.

(56) References Cited

U.S. PATENT DOCUMENTS

| | | | |
|---|---|---|---|
| 6,692,830 | B2 | 2/2004 | Argoitia et al. |
| 6,759,097 | B2 | 7/2004 | Phillips |
| 6,838,166 | B2 | 4/2005 | Phillips et al. |
| 7,047,883 | B2 | 5/2006 | Raksha et al. |
| 7,604,855 | B2 | 10/2009 | Raksha et al. |
| 8,025,952 | B2 | 9/2011 | Raksha et al. |
| 8,864,037 | B2 | 10/2014 | Callegari et al. |
| 10,029,279 | B2 | 7/2018 | Raksha |
| 10,259,254 | B2 | 4/2019 | Raksha et al. |
| 2002/0160194 | A1* | 10/2002 | Phillips .................. B42D 25/29 428/404 |
| 2006/0263539 | A1* | 11/2006 | Argoitia ............... C09D 11/037 427/532 |

(Continued)

FOREIGN PATENT DOCUMENTS

| | | |
|---|---|---|
| CN | 1748006 A | 3/2006 |
| CN | 106571101 A | 4/2017 |

(Continued)

OTHER PUBLICATIONS

Tao, "Super-strong magnetorheological fluids", J. Phys .: Condens. Matter 13 (2001) R979-R999.

(Continued)

*Primary Examiner* — Justin V Lewis
(74) *Attorney, Agent, or Firm* — Mannava & Kang, P.C.

(57) ABSTRACT

A flake including a layer of a diamagnetic material; and at least one additional layer is disclosed. The flake, such as a plurality of flakes, can be dispersed in a liquid medium to form a composition. The composition can be applied to a surface of a substrate to form a security device. A method of making the security device is also disclosed.

15 Claims, 3 Drawing Sheets

(56) References Cited

U.S. PATENT DOCUMENTS

2018/0251637 A1\* 9/2018 Zieba ................ C09C 1/62

FOREIGN PATENT DOCUMENTS

| CN | 108912839 A | 11/2018 |
|---|---|---|
| EP | 1386754 A1 | 2/2004 |

OTHER PUBLICATIONS

Sokolov et al., "3D crystallographic alignment of alumina ceramics by application of low magnetic fields", Elsevier, Journal of the European Ceramic Society (2018), 7 pages. https://doi.org/10.1016/j.jeurceramsoc.2018.06.035.

R. Brucas et al., "Magnetic anisotropy and evolution of ground-state domain structures in bcc Fe81Ni19/Co(001) superlattices", Physical Review B 78, 024421 (2008), pp. 1-15.

O. Kohmoto, Perpendicular anisotropy of sputtered Ni films, Journal of Magnetism and Magnetic Materials 239 (2002) 36-38.

Wikipedia, "Diamagnetism", retrieved from the internet on Apr. 20, 2020. <https://en.wikipedia.org/wiki/Diamagnetism>.

Geng, Wenxue "400 questions on modern electrical and electronic technology, p. 8", China Construction Industry Press, Chinese Version Library CIP Data Verification (Year 2000) No. 53401, Dec. 31, 2000, with machine English translation, 7 pages, English Language translation of Jun. 2023 Decision of Rejection from Chinese Patent Application No. 202110626501.0 is submitted herewith as a concise statement of relevance.

Tan et al., "Tutoring for general physics exercises", Liaoning Science and Technology Press, 1988, 17 pages (with machine English translation of relevant p. 331). English Language translation of Jun. 2023 Decision of Rejection from Chinese Patent Application No. 202110626501.0 is submitted herewith as a concise statement of relevance.

English Language translation of Jun. 2023 Decision of Rejection from Chinese Patent Application No. 202110626501.0 , 9 pages.

\* cited by examiner

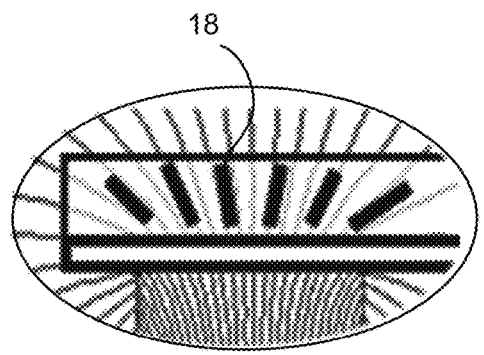
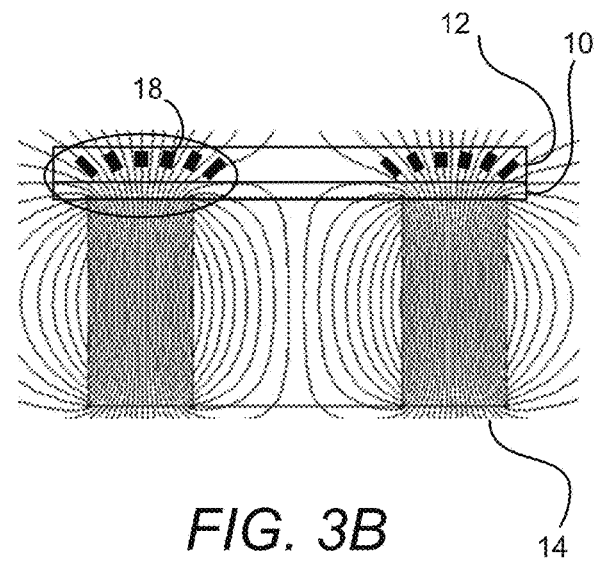
FIG. 3A  FIG. 3B
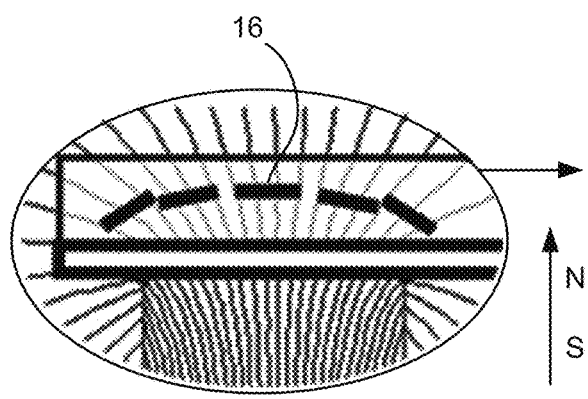
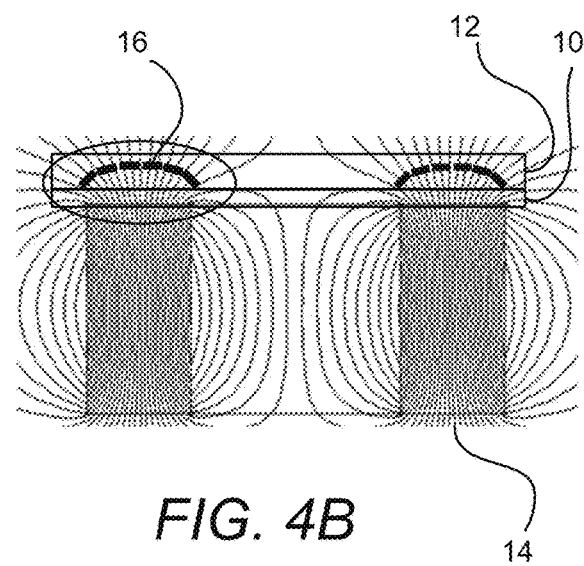
FIG. 4A  FIG. 4B

SECURITY PIGMENT

FIELD OF THE INVENTION

The present disclosure generally relates to a flake including a layer of a diamagnetic material; and at least one additional layer. The flake, such as a plurality of flakes, can be dispersed in a liquid medium to form a composition. The composition can be applied to a surface of a substrate to form a security device. A method of making the security device is also disclosed.

BACKGROUND OF THE INVENTION

Banknotes usually contain numerous security features for their protection against counterfeiting. Among these features are optical security devices exhibiting different illusive optical effects. The effects are caused by the reflection of the light from color-shifting platelets dispersed in a layer of a security ink printed on the surface of the banknote.

The security ink contains magnetizable platelets of a color-shifting interference pigment randomly oriented in an organic carrier (binder). The platelets are organized to follow the directions of the lines of an applied external magnetic field. In the magnetic field, the platelets align themselves with the longest diagonal of their planes along the magnetic lines of the field organizing themselves in the head-to-tail chains protruding in the directions of the lines. Known magnetizable color-shifting interference pigments, in the form of platelets, are multilayered thin-film structures including several materials.

The platelets contain a few different metals. One of the metals is ferromagnetic, so that the platelet responds to an applied magnetic field. Thin films of many magnetically-sensitive metals and their alloys have been described. They include Ni, Co, Fe, Gd, Tb, Dy, Er, and their alloys, FeSi, FeNi, FeCo, FeNiMo, $SmCo_5$, $NdCo_5$, $Sm_2Co_{17}$, $Nd_2FeI_4B$, $Sr_6Fe_2O_3$, $TbFe_2$, AlNiCo, $Fe_3O_4$, $NiFe_2O_4$, $MnFe_2O_4$, $CoFe_2O_4$, or garnets of the type YIG or GdIG. These metals are exhibit directional dependence.

The directional dependence of a material's magnetic properties is its magnetic anisotropy. Ferromagnetics exhibit several different kinds of magnetic anisotropy, e.g., magnetocrystalline anisotropy, shape anisotropy, magnetoelastic anisotropy, exchange anisotropy, induced magnetic anisotropy, and texture induced anisotropy. The overall magnetic anisotropy of a platelet is a sum of all of these factors. However, the contribution of these factors to the directionality of the platelet is different. The shape anisotropy gives the largest contribution to the platelet orientation when it is exposed to an external field. In this case, the longest dimension of a magnetized body analogous to an "easy" magnetization axis, which in the case of a platelet is one of its diagonals.

What is needed is another class of magnetic materials that can be used to make banknotes with different illusive optical effects thereby providing protection against counterfeiting.

SUMMARY OF THE INVENTION

In an aspect, there is disclosed a flake including a layer of a diamagnetic material; and at least one additional layer.

In another aspect, there is disclosed a method of making a security device including dispersing, in a liquid medium, a flake including a layer of a diamagnetic material, and at least one additional layer to form a composition; applying the composition to a substrate to form a security device; applying a magnetic field to the security device so that a plane of the flakes align perpendicular to the magnetic field.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein:

FIG. 3A illustrates an enlarged view of a section of FIG. 3B;

FIG. 3B illustrates magnetic flakes aligned parallel with the magnetic field of FIG. 2B;

FIG. 4A illustrates an enlarged view of a section of FIG. 4B;

FIG. 4B illustrates flakes according to an aspect of the present application that are aligned perpendicular with the magnetic field of FIG. 2B;

Throughout this specification and figures like reference numbers identify like elements.

DETAILED DESCRIPTION OF THE INVENTION

Figure 1:
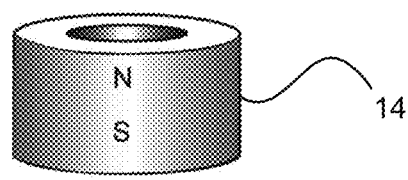
FIG. 1 illustrates a magnet.

It is to be understood that both the foregoing general description and the following detailed description are exemplary and explanatory only, and are intended to provide an explanation of various embodiments of the present teachings. The layers/components shown in each Figure may be described with regard to a particular Figure, but it is understood that the description of a particular layer/component would be applicable to the equivalent layer/component in the other Figures.

In its broad and varied embodiments, disclosed herein is a flake including a layer of a diamagnetic material; and at least one additional layer. The flake, such as a plurality of flakes, can be dispersed in a liquid medium to form a composition. The composition can be applied to a surface of a substrate to form a security device. A method of making the security device is also disclosed.

The flake can include a layer of diamagnetic material. The electrons in a diamagnetic material can rearrange their orbits creating small persistent currents which oppose a magnetic field. In this manner, a diamagnetic material can be repelled by a magnetic field. Non-limiting examples of diamagnetic materials include bismuth, copper, mercury, silver, gold, palladium, beryllium, calcium, zinc, lead, cadmium, thallium. In an aspect, the diamagnetic material is bismuth. The diamagnetic material can be an inorganic compound, such as AgCl, and BiCl3. In another aspect, the diamagnetic material can include organic compounds, such as aniline, benzene, methane, octane, naphthalene, and diphenlamine.

In order for the diamagnetic material to be effected by a magnetic field, it should have a particular volume magnetic susceptibility range determined by the formula: M=XvH, in which M is the magnetization of the material (amperes/meter), H is the magnetic field strength (amperes/meter), and Xv is a negative number. In an aspect, the diamagnetic material has a volume magnetic susceptibility ranging from about $-2.00\times 106$ to about $-300.0\times 106$; for example, from about $-5.00\times 106$ to about $-290.0\times 106$; and as a further example, from about $-10.00\times 106$ to about $-285.0\times 106$.

The layer of diamagnetic material can be present in any suitable physical thickness that can allow the diamagnetic material to be influenced by a magnetic field. For this reason, generally, the layer of diamagnetic material is generally thicker than a layer of magnetic material, such as a ferromagnetic or paramagnetic material. In an aspect, the diamagnetic material can be present in a layer having a physical thickness ranging from about 250 nm to about 3000 nm; for example, from about 500 nm to about 3000; and as a further example, from about 750 nm to about 2500 nm. In another aspect, the layer of the diamagnetic material has a physical thickness ranging from about 950 nm to about 2000 nm The flake can include at least one additional layer, such as a reflector layer, a dielectric or spacer layer, and an absorber layer. The at least one additional layer can be present on a first surface of the layer of the diamagnetic material. For example, the flake can have the following structure: diamagnetic material/reflector/dielectric/absorber. In this manner, the flake is asymmetric.

In another aspect, the at least one additional layer can be present on a first surface and a second surface of the layer of the diamagnetic material. For example, the flake can have the following structure: absorber/dielectric/reflector/diamagnetic material/reflector/dielectric/absorber. In this manner, the flake is symmetric. The layer of diamagnetic material can be a central layer or core in the flake. In another aspect, the flake can include any and all combinations and layer structures including the layer of diamagnetic material and the at least one additional layer. The selection of materials present in the at least one additional layer and the structure of the flake can be designed depending upon the intended use of the flake.

The reflector layer for use in the flake disclosed herein can include metals and/or metal alloys. In one example, any materials that have reflective characteristics can be used. Non-limiting examples of material with reflecting properties include aluminum, silver, copper, gold, platinum, tin, titanium, palladium, nickel, cobalt, rhodium, niobium, chromium, and compounds, combinations or alloys thereof. Examples of other suitable reflective alloys and compounds include bronze, brass, titanium nitride, and the like, as well as alloys of the metals listed above such as silver-palladium. The reflector layer can have an inherent color such as copper, gold, silver copper alloys, brass, bronze, titanium nitride, and compounds, combinations or alloys thereof.

The absorber layer can include any absorber material, including both selective absorbing materials and nonselective absorbing materials. For example, the absorber layer can be formed of nonselective absorbing metallic materials deposited to a thickness at which the absorber layer is at least partially absorbing, or semi-opaque. An example of a non-selective absorbing material can be a gray metal, such as chrome or nickel. An example of a selective absorbing material can be copper or gold. In an aspect, the absorbing material can be chromium. Non-limiting examples of suitable absorber materials include metallic absorbers such as chromium, aluminum, silver, nickel, palladium, platinum, titanium, vanadium, cobalt, iron, tin, tungsten, molybdenum, rhodium, niobium, carbon, graphite, silicon, geranium, cermet and various combinations, mixtures, compounds, or alloys of the above absorber materials that may be used to form the absorber layer.

Examples of suitable alloys of the above absorber materials can include Inconel (Ni—Cr—Fe), stainless steels, Hastalloys (Ni—Mo—Fe; Ni—Mo—Fe—Cr; Ni—Si—Cu) and titanium-based alloys, such as titanium mixed with carbon (Ti/C), titanium mixed with tungsten (Ti/W), titanium mixed with niobium (Ti/Nb), and titanium mixed with silicon (Ti/Si), and combinations thereof. Other examples of suitable compounds for the absorber layer include titanium-based compounds such as titanium silicide (TiSi2), titanium boride (TiB2), and combinations thereof. Alternatively, the absorber layer can be composed of a titanium-based alloy disposed in a matrix of Ti, or can be composed of Ti disposed in a matrix of a titanium-based alloy.

The dielectric layer can act as spacers in the flake. The dielectric layer can be formed to have an effective optical thickness for a particular wavelength. The dielectric layer can be optionally clear, or can be selectively absorbing so as to contribute to the color effect of a pigment. The optical thickness is a well-known optical parameter defined as the product nd, where n is the refractive index of the layer and d is the physical thickness of the layer. Typically, the optical thickness of a layer is expressed in terms of a quarter wave optical thickness (QWOT) that is equal to $4\eta rf/\lambda$, where $\lambda$ is the wavelength at which a QWOT condition occurs. The optical thickness of the dielectric layer can range from about 2 QWOT at a design wavelength of about 400 nm to about 9 QWOT at a design wavelength of about 700 nm, and for example about 2-6 QWOT at 400-700 nm, depending upon the color shift desired. The dielectric layer can have a physical thickness of about 100 nm to about 800 nm, and for example from about 140 nm to about 650 nm, depending on the color characteristics desired.

Suitable materials for a dielectric layer include those having a "high" index of refraction, defined herein as greater than about 1.65, as well as those have a "low" index of refraction, which is defined herein as about 1.65 or less. The dielectric layer can be formed of a single material or with a variety of material combinations and configurations. For example, the dielectric layer can be formed of only a low index material or only a high index material, a mixture or multiple sublayers of two or more low index materials, a mixture or multiple sublayers of two or more high index materials, or a mixture or multiple sublayers of low index and high index materials. In addition, the dielectric layer can be formed partially or entirely of high/low dielectric optical stacks. When a dielectric layer is formed partially with a dielectric optical stack, the remaining portion of the dielectric layer can be formed with a single material or various material combinations and configurations as described above.

Non-limiting examples of suitable high refractive index materials for the dielectric layer include zinc sulfide (ZnS), zinc oxide (ZnO), zirconium oxide (ZrO2), titanium dioxide (TiO2), diamond-like carbon, indium oxide (InO3), indium-tin-oxide (ITO), tantalum pentoxide (Ta2O5), cerium oxide (CeO2), yttrium oxide (Y2O3), europium oxide (Eu2O3), iron oxides such as (II)diiron(III) oxide (FeO4) and ferric oxide (Fe2O), hafnium nitride (HfN), hafnium carbide (HfC), hafnium oxide (HfO2), lanthanum oxide (La2O3), magnesium oxide (MgO), neodymium oxide (Nd2O3), praseodymium oxide (Pr6O11), samarium oxide (Sm2O3), antimony trioxide (Sb2O3), silicon monoxide (SiO), selenium trioxide (Se2O3), tin oxide (SnO2), tungsten trioxide (WO), combinations thereof, and the like.

Non-limiting examples of suitable low refractive index materials for the dielectric layer includes silicon dioxide (SiO$_2$), aluminum oxide (Al$_2$O$_3$), metal fluorides such as magnesium fluoride (MgF2), aluminum fluoride (AlF3), cerium fluoride (CeF3), lanthanum fluoride (LaF3), sodium aluminum fluorides (e.g., Na3AlF6, Na5Al3F14), neodymium fluoride (NdF3), samarium fluoride (SmF3), barium fluoride (BaF2), calcium fluoride (CaF2), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

The flake, such as a plurality of flakes, can be dispersed in a liquid medium to form a composition. Non-limiting examples of a liquid medium include polyvinyl alcohol, polyvinyl acetate polyvinylpyrrolidone, poly(ethoxyethylene), poly(methoxyethylene), poly(acrylic) acid, poly(acrylamide), poly(oxyethylene), poly(maleic anhydride), hydroxyethyl cellulose, cellulose acetate, poly(sacchrides) such as gum arabic and pectin, poly(acetals) such as polyvinylbutyral, poly(vinyl halides) such as polyvinyl chloride and polyvinylene chloride, poly(dienes) such as polybutadiene, poly(alkenes) such as polyethylene, poly(acrylates) such as polymethyl acrylate, poly(methacrylates) such as poly methylmethacrylate, poly(carbonates) such as poly (oxycarbonyl oxyhexamethylene, poly(esters) such as polyethylene terephthalate, poly(urethanes), poly(siloxanes), poly(suphides), poly(sulphones), poly(vinylnitriles), poly (acrylonitriles), poly(styrene), poly(phenylenes) such as poly(2,5 dihydroxy-1,4-phenyleneethylene), poly(am ides), natural rubbers, formaldahyde resins, other polymers and mixtures of polymers and polymers with solvents.

The composition can be applied to a surface of a substrate to form a security device. The substrate can be made of a flexible material. The substrate can be any suitable material that can receive multiple layers deposited during the manufacturing process. Non-limiting examples of suitable substrate materials include polymer web, such as polyethylene terephthalate (PET), glass foil, glass sheets, polymeric foils, polymeric sheets, metal foils, metal sheets, ceramic foils, ceramic sheets, ionic liquid, paper, silicon wafers, etc. The substrate can vary in thickness, but can range for example from about 2 µm to about 100 µm, and as a further example from about 10 µm to about 50 µm.

A method of making a security device includes dispersing, in a liquid medium, a flake including a layer of a diamagnetic material, and at least one additional layer to form a composition; applying the composition to a substrate to form a security device; and applying a magnetic field to the security device so that a plane of the flakes align perpendicular to the magnetic field.

The application of the magnetic field includes positioning the substrate, with the applied composition, over a magnet. The magnet can be a permanent magnet, such as neodymium iron boron, samarium cobalt, ceramic magnets, ferrite magnets, and AlNiCo; or an electromagnet. In an aspect, the magnet can be any magnet capable of producing a magnetic field strength for planarizing the flake including a layer of diamagnetic material. For example, the magnet can have a maximum energy product (BHmax) greater than about 3.5, such as greater than about 5.5, and as a further example, greater than about 26.

The planarization of the flakes containing a diamagnetic material can take from several seconds to greater than a minute, such as several minutes. For this reason, the application of the magnetic field can be for a period of time greater than 10 seconds, such as greater than 30 seconds, for example, for greater than a minute.

Factors such as the time available for planarization, viscosity of the liquid medium, size of the flakes, and magnetic characteristics of the flakes may affect the desired alignment of the flakes. In the present application, the flakes including a layer of diamagnetic material are aligned perpendicular to the magnetic field.

The method can also include curing the aligned flakes perpendicular to the magnetic field. The step of curing can involve any drying and/or curing process that fixes the aligned flakes, such as, using ultraviolet light, visible light, infrared, or electron beam. In this manner, the cured, aligned flakes can form opaque regions on the substrate.

Figure 5:
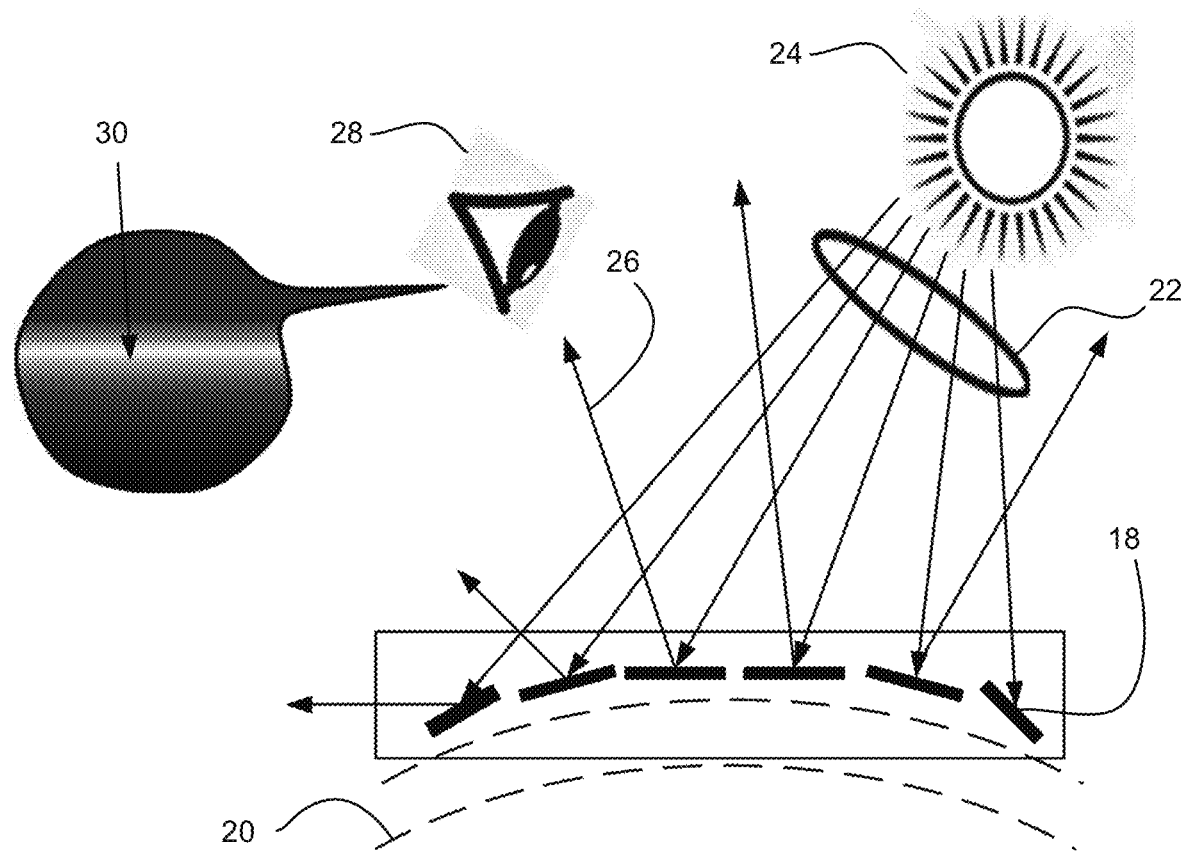
FIG. 5 illustrates an optical effect, for example, obtained from FIGS. 3A and 3B.

Optical effects, in optical security devices printed with magnetizable pigments, are based on the reflection of light rays, falling onto flat platelets of the pigments toward the observer, as illustrated in FIG. 5. Magnetic platelets 18 are aligned along magnetic lines 20 as a Fresnel-like convex cylindrical reflector. Light rays 22 from a light source 24 extend onto the planes of platelets 18. Smooth and flat surfaces of differently oriented platelets reflect the rays 22 into a surrounding space in a plurality of directions governed by the law of reflection. The ray 26, coming into the eye of the observer 28 without losses, looks like the brightest. All other reflected rays are perceived in different shades of gray. In the mind of the observer, all rays together look like a bright band 30 on a dark background to create an optical effect. The difference in the optical effect produced by the recited flake is explained in detail below.

EXAMPLE

A flake was prepared having the following structure: Cr/MgF$_2$/Al/Bi 1000 nm/Al/MgF$_2$/Cr. The flake was dispersed in a liquid medium to form a composition, e.g., a UV-curable ink. The composition was coated onto a paper substrate with a silk-screen technique to form a security device. The composition was exposed to a magnetic field from a ring-like magnet, as shown in FIG. 1.

Figure 2A:
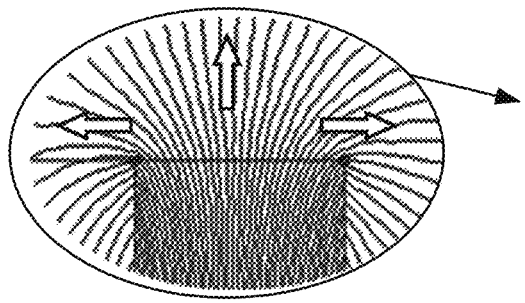
FIG. 2A illustrates an enlarged view of a section of FIG. 2B.
Figure 2B:
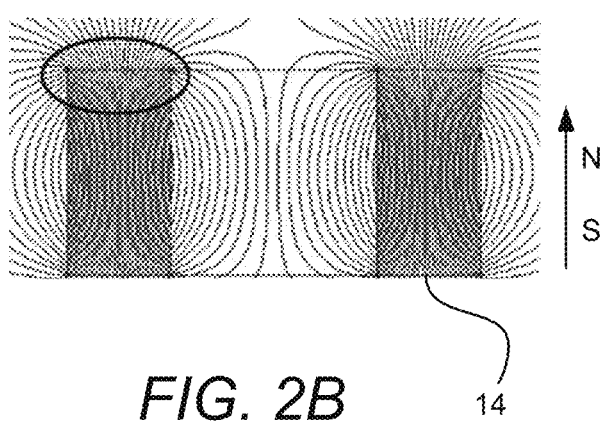
FIG. 2B illustrates a magnetic field produced by, a cross-sectional view of, the magnet of FIG. 1.

The magnet exhibited a magnetic field as shown in FIGS. 2A and 2B. As shown in FIG. 2A, the direction of the magnetic field lines in the middle of a top surface of the magnet is perpendicular, center arrow, to the surface. Additionally, the direction of the magnetic field lines near the edge of the surface are horizontal, right and left arrows.

FIGS. 4A and 4B illustrate the composition when exposed to the magnetic field shown in FIGS. 2A and 2B. As shown in FIG. 4B, the substrate 10, e.g., a paper card, was coated with a layer 12 of the composition, i.e., the flakes 16 dispersed in a liquid medium. The substrate 10 was placed on the magnet 14, which is shown as a cross-section of the magnet in FIG. 1. The flakes 16 were repelled by the magnetic field and oriented themselves in the liquid medium with the planes of the flakes 16 perpendicular to the magnetic field lines. FIG. 4A illustrates an enlarged view of a section of FIG. 4B.

COMPARATIVE EXAMPLE

A flake was prepared having the following structure: Cr/MgF$_2$/Al/Ni 60 nm/Al/MgF$_2$/Cr. The flake was dispersed in a liquid medium to form a composition, e.g., a UV-curable ink. The composition was coated onto a paper substrate with a silk-screen technique to form a security device. The composition was exposed to a magnetic field from a ring-like magnet, as shown in FIG. 1. The magnetic field is shown in FIGS. 2A and 2B.

FIGS. 3A and 3B illustrate the composition when exposed to the magnetic field shown in FIGS. 2A and 2B. As shown in FIG. 3B, the substrate 10, e.g., a paper card, was coated with a layer 12 of the composition, i.e., the flakes 18 dispersed in a liquid medium. The substrate 10 was placed on the magnet 14, which is shown as a cross-section of the magnet in FIG. 1. The flakes 18 oriented themselves in the liquid medium with the planes of the flakes 16 parallel to the magnetic field lines. FIG. 3A illustrates an enlarged view of a section of FIG. 3B.

Figure 6:
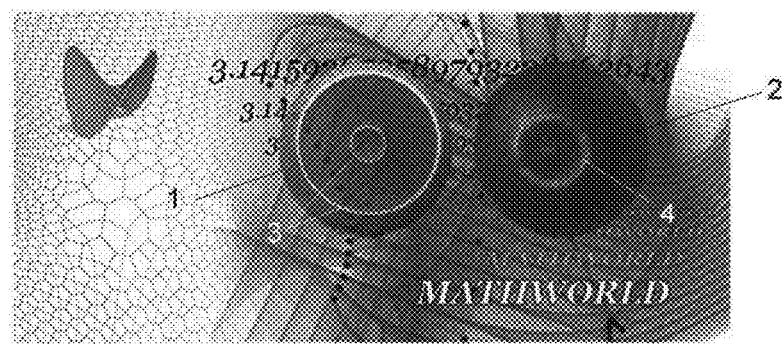
FIG. 6 illustrates security note with a magnetic pigment (left) and a security pigment according to an aspect of the invention (right).

Referring now to FIG. 6, two ink-filled round regions 1 and 2 of the same size were side-by-side printed through the same silkscreen onto a substrate, paper test note, with colorless, transparent UV curable compositions containing the inventive flakes (Bi-containing) and comparative flakes (Ni-containing) dispersed in similar concentrations. Each of the printed features was placed on the top of the same permanent magnet and the composition was cured with UV light after alignment of the flakes in the magnetic field.

The composition in region 1 contained a comparative flake with a magnetizable nickel central layer. The region 1 demonstrated a semi-transparent gray-filled circle and two narrow bright circular contours 3. The gray-filled area occurred because the nickel-containing flakes were aligned vertically with the surface of the substrate, i.e. with the longest plane of the flake aligned parallel with the magnetic field, as shown in FIGS. 3A and 3B. The aligned flakes are at a very steep angle with respect to the substrate surface, are spaced far apart, thereby allowing observation of the substrate graphics through the solidified colorless composition. The bright contours 3 refer to the places where the flakes are aligned parallel to the surface of the substrate at the edges of the magnet, as illustrated by the horizontal left and right arrows in FIG. 2A.

Returning to FIG. 6, region 2, printed with a composition containing flakes with a layer of diamagnetic material, e.g., bismuth, has a completely different appearance. It doesn't have transparent regions. Flakes in the feature are at small angles to the substrate reflecting incident light in different directions. The platelets with their planes parallel to the surface of the substrate (and perpendicular to the magnetic field) are forming bright contour 4, as illustrated in FIGS. 4A and 4B. The appearance and a cross-sectional analysis of composition prove repulsion of the diamagnetic-containing flakes by the applied magnetic field.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. A flake, comprising:
   a layer of a diamagnetic material;
   a reflector layer in contact with a first surface of the layer of the diamagnetic material; and
   at least two additional layers including a dielectric layer and an absorber layer, the dielectric layer being in contact with the reflector layer and the absorber layer being in contact with the dielectric layer,
   wherein the diamagnetic material has a volume magnetic susceptibility ranging from $-2.00 \times 10^6$ to $-300.0 \times 10^6$.

2. The flake of claim 1, wherein the diamagnetic material is bismuth.

3. The flake of claim 1, wherein the diamagnetic material has a volume magnetic susceptibility ranging from $-10.00 \times 10^6$ to $-285.0 \times 10^6$.

4. The flake of claim 1, wherein the layer of the diamagnetic material has a physical thickness ranging from 950 nm to 2000 nm.

5. The flake of claim 1, wherein the at least two additional layers include a second reflector layer, a second absorber layer, and a second dielectric layer.

6. The flake of claim 1, wherein the flake is symmetric.

7. The flake of claim 1, wherein the flake is asymmetric.

8. The flake of claim 1, wherein the layer of a diamagnetic material is a central layer in the flake.

9. A composition, comprising:
   a plurality of flakes of claim 1 dispersed in a liquid medium.

10. A security device, comprising:
    a substrate; and
    the composition of claim 9 applied to a surface of the substrate.

11. The security device of claim 10, wherein the substrate is polyethylene terephthalate, glass foil, glass sheets, polymeric foils, polymeric sheets, metal foils, metal sheets, ceramic foils, ceramic sheets, ionic liquid, paper, silicon wafers.

12. A method of making a security device, comprising:
    dispersing, in a liquid medium, a flake including a layer of a diamagnetic material, a reflector layer in contact with a first surface of the layer of the diamagnetic material, and at least two additional layers including a dielectric layer and an absorber layer, the dielectric layer being in contact with the reflector layer and the absorber layer being in contact with the dielectric layer, to form a composition;
    applying the composition to a substrate to form a security device;
    applying a magnetic field to the security device so that a plane of the flakes align perpendicular to the magnetic field; and curing the aligned flakes perpendicular to the magnetic field.

13. The method of claim 12, wherein application of the magnetic field is for a period of time greater than 10 seconds.

14. The method of claim 12, wherein application of the magnetic field is from a magnet having a maximum energy product greater than 3.5.

15. The method of claim 12, wherein the cured, aligned flakes form opaque regions on the substrate.

* * * * *